May 14, 1957 R. A. RAMEY ET AL 2,792,564
FLIP-FLOP CIRCUIT ELEMENTS FOR CONTROL CIRCUITS
Filed May 27, 1955

WITNESSES
Leon J. Fara
James F. Young

INVENTORS
Robert A. Ramey and
William G. Hall
BY
Ezra N. Savage
ATTORNEY

United States Patent Office 2,792,564
Patented May 14, 1957

2,792,564

FLIP-FLOP CIRCUIT ELEMENTS FOR CONTROL CIRCUITS

Robert A. Ramey, Library, and William G. Hall, Wilkinsburg, Pa., assignors to Westinghouse Electric Corporation, East Pittsburgh, Pa., a corporation of Pennsylvania Application May 27, 1955, Serial No. 511,506

5 Claims. (Cl. 340—174)

The invention relates generally to control systems and more particularly to a flip-flop circuit element of a control system for storing signals.

The object of the invention is to provide for maintaining a core of a flip-flop circuit element of a control system positively energized to store a received signal and to enable the system to deliver an output at a later time and thereby function as if the flip-flop circuit element had a memory.

The invention, accordingly, comprises the features of construction, combination of elements, and arrangement of parts, which will be exemplified in the construction hereinafter set forth and the scope of the application of which will be indicated in the claims.

Figure 1:
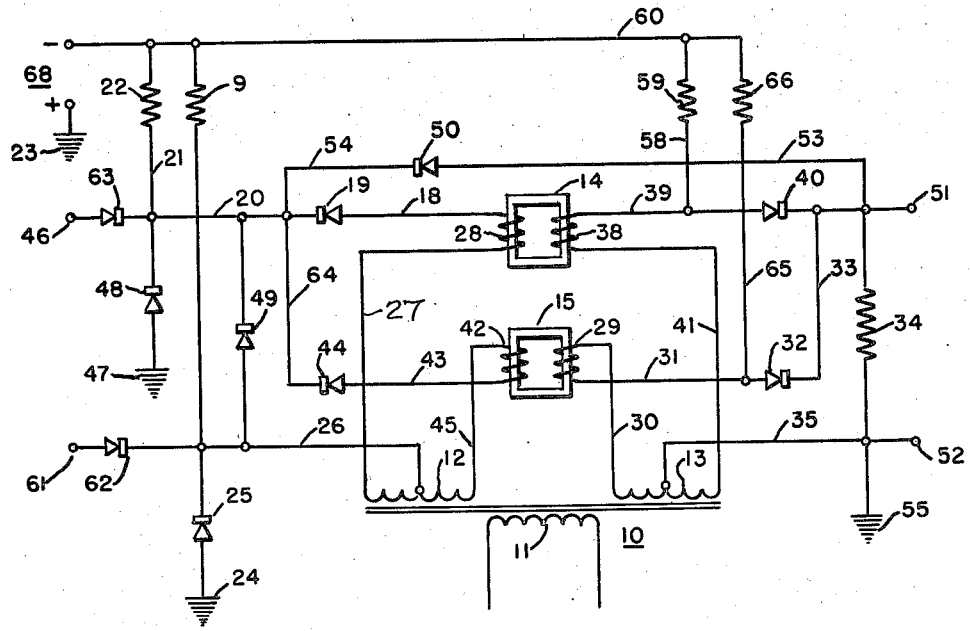
Figure 2:
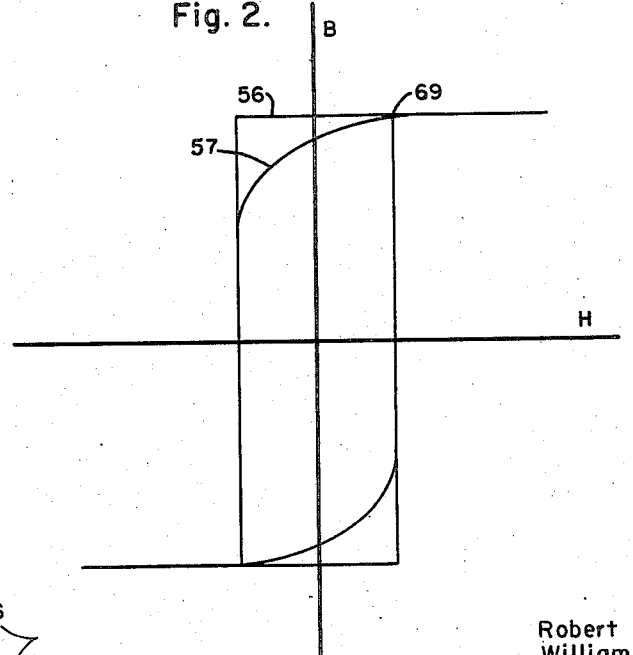

For a fuller understanding of the nature and objects of the invention, reference should be had to the following detailed description taken in connection with the accompanying drawing, in which:

Figure 1 is a diagrammatic view of a flip-flop circuit element of a control system embodying the features of the invention; and Fig. 2 is a diagram of a hysteresis loop for a core having predetermined characteristics.

Referring now to the drawing and Fig. 1 in particular, a transformer shown generally at 10 comprises a primary winding 11 and two secondary windings 12 and 13. The transformer 10 may be designed to be connected across any suitable power source. Generally, the voltage used will be 110 as this has been found to be satisfactory for such control systems.

Two cores 14 and 15 are provided and are electrically connected to the transformer windings 12 and 13. The type of core employed will depend on the functions to be performed. Anyone skilled in this art can readily design cores such as 14 and 15 to perform the functions required in such a control system.

In this embodiment of the invention only two cores 14 and 15 are utilized, but it is to be readily understood that any number of cores may be utilized depending on the functions to be performed. The cores will be arranged in pairs such as 14 and 15 and each core will be provided with a gating circuit and a reset circuit. Further, it will be observed that the gating and reset circuits are so arranged that as one core is driven to positive saturation, the other will be driven to negative saturation in one half cycle and the saturation of the cores will be reversed during the next half cycle.

The arrangement of the elements and circuits of the control system can best be explained by describing an operation of the flip-flop circuit element of a control system. The elements utilized are elements well known in this art and need not be described in detail. The arrangement of the circuits and the functions performed involve the invention.

As has been pointed out hereinbefore, the cores 14 and 15 each have a gating circuit and a reset circuit. In this art, a gating circuit for a core, such as 14 or 15, is one provided with a source of energy and means such as a rectifier so disposed that current may flow only in a direction which will effect the driving of the core to positive saturation. A reset circuit is one provided with a source of energy and means for so controlling the current flow that it may be utilized for driving a core to negative saturation. Thus, when it was stated hereinbefore that each of the cores 14 and 15 had a gating and reset circuit, it was indicated that means was provided for driving each of the cores to positive or negative saturation. The function of the gating and reset circuits will appear as the description proceeds.

In describing this modification of the invention, the gating circuits and the reset circuits will first be described and traced in detail and then their functioning set forth. The reset circuits as traced will be connected to ground through a direct current power source 68. As shown, the positive terminal of the direct current source is connected to the ground 23 and the negative to the flip-flop circuit element which constitutes the invention.

The cores 14 and 15, referred to hereinbefore, each have two windings, one winding of each core is connected in a gating circuit and the other in a reset circuit. In the embodiment of the invention illustrated, a winding 28 on core 14 is connected in the reset circuit while the winding 38 is connected in the gating circuit. The core 15 has a winding 42 connected in its reset circuit and the winding 28 connected in its gating circuit.

The reset circuit for the core 14 may be traced from a terminal of a section of the secondary winding 12 of the transformer 10 through conductor 27, winding 28 of core 14, conductor 18, rectifier 19, conductors 20 and 21, resistor 22 and the direct current source 68 to ground 23 and thence back through ground 24, rectifier 25, conductor 26, to the other terminal of the section of the secondary winding 12 of the transformer 10. It will be noted that this reset winding is provided with a rectifier 19 which is so disposed that current may flow through the circuit in the direction required to drive the core 14 to negative saturation.

The reset circuit for the core 15 may be traced from a terminal of another section of the secondary winding 12 of the transformer 10 through conductor 45, winding 42 disposed on the core 15, conductor 43, rectifier 44, conductors 64, 20 and 21, resistor 22, direct current source 68, ground 23, back through ground 24, rectifier 25, conductor 26, to the opposite terminal of the section of the secondary winding 12 from whence the circuit started. This circuit has a rectifier 44 which will restrict the current flow to one direction only. When current flows in this reset circuit it will tend to drive the core 15 to negative saturation.

In order to protect the elements of the reset circuits for the cores 14 and 15 a non-linear device is employed. In this instance the non-linear device connected in circuit relationship with the reset circuits for the cores 14 and 15 includes the resistor 22, direct current power source 68, and the rectifier 48 connected to ground at 47. The resistor 22 will be designed to meet the characteristics of the circuits. In a circuit similar to the present embodiment good results were obtained with a resistor designed to have about 22,000 ohms resistance.

In the functioning of the reset circuits for cores 14 and 15, during the driving of either core to negative saturation, the corresponding non-linear device permits the applying of substantially all of the supply voltage across the reset winding, thereby utilizing a supply voltage of relatively small magnitude until the core reaches negative saturation when the non-linear device functions to limit current flow through the reset winding and prevents a drain on the alternating current supply source for the reset circuit. Thus, the non-linear device protects the elements of the flip-flop circuit.

The gating circuit for core 14 extends from a terminal of a section of the secondary winding 13 of the transformer 10 through conductor 41, winding 38 of the core 14, conductor 39, rectifier 40, resistor 34, conductor 35 back to the opposite terminal of the section of the secondary winding 13 of the transformer 10. It will be noted that the rectifier 40 restricts the flow of current in this gating circuit to a predetermined direction which tends to drive the core to positive saturation.

The gating circuit for the core 15 may be traced from one terminal of another section of the secondary winding 13 of the transformer 10 through conductor 30, winding 29 on the core 15, conductor 31, rectifier 32, conductor 33, resistor 34, conductor 35 back to another terminal of the same section of the secondary winding 13 of the transformer 10. This circuit also has a rectifier for controlling the direction of the flow of current. The rectifier is so disposed that when current flows it tends to drive the core 15 to positive saturation.

In addition to the gating and reset circuits described hereinbefore, a feedback circuit is provided for the windings 38 and 29 of the cores 14 and 15, respectively. As shown, this feedback circiut extends from the terminal 51 of the output terminals 51 and 52 through conductor 53, rectifier 50, conductors 54, 20 and 21, resistor 22, direct current source 68 to the ground at 23 and from the ground at 55 back to the other terminal 52 of the output terminals. The windings 38 and 29 of the cores 14 and 15, respectively, are connected across the output terminals 51 and 52 through the rectifiers 40 and 32, respectively.

In the operation of the system when the transformer 10 is energized, current will flow in the windings of both the cores 14 and 15. Assuming that the current flowing in the gating circuit in which the winding 38 is connected in circuit relationship drives the core 14 to positive saturation, then the current flowing in the reset circuit of the core 15 through the winding 42 will drive the core 15 to negative saturation. In the next half cycle the current in the gating circuit, including the winding 29 of the core 15, will drive core 15 to positive saturation and the winding 28 in the reset circuit of the core 14 will drive core 14 to negative saturation. As the flow of current continues cycle after cycle, the saturation of the cores 14 and 15 will be positive and negative alternately until something occurs to interrupt or block the circuits.

Assume now that the flip-flop circuit element of the control system is connected to receive signals and, therefore, deliver output. Further assume that a signal is received at the terminal 46 in the form of a voltage applied and that the voltage applied is greater than the voltage across the winding 28 of the core 14. A rectifier 49 is connected between conductors 20 and 26 and so disposed that it blocks current flow from 20 to 26.

The signal will be received at some particular time in the functioning of the system. When received, it will oppose the voltage of whichever core is being driven to negative saturation at that instant. Since the voltage of the signal is greater than the voltage across the core, the flow of current in the reset circuit will be blocked.

For purposes of explanation, assume that core 14 has been driven to positive saturation at the instant the signal is received at terminal 46. If core 14 is positively saturated, then core 15 will be negatively saturated.

A voltage signal received at terminal 46 will usually be a direct current voltage. This direct current voltage will be greater than the voltage across the winding 28 and will block the functioning of the reset circuit of the core 14. Therefore, during the next half cycle the core 14 will remain positively saturated.

During the half cycle prior to the reception of a signal at the terminal 46, the voltage applied to the winding 38 of the core 14 through the gating circuit was absorbed in the driving of the core to saturation and only an exciting current flowed in the gating circuit. Therefore, a voltage capable of delivering an output did not appear across the output terminals 51 and 52. During the following half cycle, which would normally be a reset cycle for the core 14 no change in the saturation of the core occurred because the reset circuit of the core 14 was effectively blocked by the signal received at the terminal 46.

At the beginning of the next half cycle fololwing what normally would have been the reset cycle of the core 14, we find that the core 14 stands positively saturated. Therefore, the voltage applied through the gating circuit for the core 14 will not be absorbed in saturating the core but will build up a predetermined voltage across the terminals 51 and 52 and the flip-flop circuit element of the control system is ready to deliver an output.

At the instant the signal is received through the terminal 46 the core 15 is negatively saturated. During the next half cycle the gating circuit is established and the core 15 is driven to positive saturation. In the half cycle following the driving of core 15 to positive saturation, the reset circuit for the core 15 should drive it to negative saturation. However, the signal at terminal 46 through conductor 20 or the feedback through rectifier 50 and conductors 54 and 64 will block the establishment of the reset circuit and core 15 will remain positively saturated. Then on the following half cycle the voltage applied through the gating cycle for the core 15 will not all be absorbed in saturating the core but will build up a predetermined voltage across the terminals 51 and 52. From this point on, with each half cycle either the core 14 or the core 15 will apply a voltage, capable of delivering an output, across the terminals 51 and 52.

Since an output voltage is maintained across the terminals 51 and 52 by the voltage built up on the cores 14 and 15 alternately by their respective gating circuits, a substantially constant voltage will be maintained on the feedback circuit through conductor 53, rectifier 50 and conductor 54 to block the reset circuits for the cores 14 and 15, respectively. Therefore, even if the signal received at terminal 46 is discontinued, the flip-flop circuit element continues to stand ready to deliver an output at the terminals 51 and 52 and the signal received is stored to be delivered at any predetermined time. Therefore, the flip-flop circuit element of the control system appears to have a memory and will deliver at a later time a signal received.

As described herein, the rectifiers 19 and 44 connected in circuit relation in the reset circuits of the cores 14 and 15, respectively, are first blocked by the signal received at the terminal 46 and then by the feedback circuit through the rectifier 50. As long as this condition is maintained, there is no functioning of the reset circuits of the cores 14 and 15, respectively. This condition of the flip-flop circuit element of the control system is sometimes described as the "on" condition.

Assuming now that it is desired to clear the flip-flop circuit element of the control system and establish what may be described as the "off" condition, a signal is delivered through terminal 61, rectifier 62, conductor 26, a section of secondary winding 12 of the transformer 10, conductor 27, the winding 28 of the core 14, conductor 18 and rectifier 19 or through the other section of winding 12, conductor 45, winding 42 of core 15, conductor 43 and rectifier 44. The voltage of the signal delivered together with the voltage across either section of the secondary winding 12 of the transformer 10 will be greater than the voltage on the feedback circuit and the flip-flop circuit element will be unblocked and the reset circuits for the cores 14 and 15 reestablished.

It will be noted that a linear device such as provided in conjunction with the reset circuits is utilized in circuit relationship with the circuit for delivering the unblocking signal. As shown, this linear device comprises the direct current source 68, conductor 60, resistor 9, rectifier 25 and ground at 24.

With the reestablishment of the "off" condition, the cores 14 and 15 will again be alternately driven to positive and negative saturation. It has been found that when a core such as 14 is positively saturated as described hereinbefore, the fact that the hysteresis loop is not a rectangle 56 as illustrated but conforms more to the curve 57, illustrated in Fig. 2, that the magnetic flux decays quickly. There are two features working to effect the gradual decay of the magnetism of core 14. The first cause of decay is the imperfect hysteresis loop and the second is a certain amount of leakage through the rectifiers. The decay of the magnetism of the core because of the characteristics of the hysteresis loop is well known and need not be described in detail. Further, the leakage of the rectifier permits current to flow in a direction which effects a certain amount of desaturation of the core.

In this type of circuit, tests reveal that under ordinary conditions as described, the flux in core 14 may so decay in about twenty seconds that the signal is no longer stored. Therefore, the circuit is more or less ineffective for longer periods of time. In order to provide for storing a signal, or what is sometimes referred to as giving the system a longer memory, a circuit is provided extending from conductor 39 through conductor 58, resistor 59, conductor 60, direct current source 68 to the ground at 23. It is well known that the ohmic resistance of such a circuit may be predetermined with great accuracy. In tests made by utilizing a resistor 59 having a resistance of about 220,000 ohms, enough current was caused to flow from the positive side 51 of the output circuit through resistor 59, conductor 60, direct current source 68, ground 23, back by way of the ground 55, conductor 35, a section of the winding 13 of the transformer 10, conductor 41 and winding 38 to maintain saturation of the core 14 for several days. Thus, this flip-flop circuit element of a control system can be utilized for storing signals received for substantial periods of time after a signal ceases to be delivered.

A circuit for preventing the rapid decay of flux in the core 15 may be traced from conductor 31 through conductor 65, resistor 66 and conductor 60 to the ground at 23 and back by way of ground 55, conductor 35, a section of the winding 13 of transformer 10, conductor 30 and winding 29 of core 15. As described hereinbefore, the resistor 66 may be designed to give the correct current flow to maintain the core 15 positively saturated.

In designing the resistors 59 and 66 it is necessary that the current flow should be so limited that the voltage is not driven far beyond the point 69 on the hysteresis loop, as indicated in Fig. 2. In fact, it would be adequate if the current permitted the point 69 to drop back slightly along the hysteresis loop 57. If the point 69 is carried too far to the right, as shown in Fig. 2, it would be difficult or impossible to drive the core 14 or 15 to negative saturation.

When circuits of this type are utilized for performing control functions, any desired number of cores with corresponding signal receiving circuits may be provided. In this manner, any number of signals may be received and stored and an output delivered at a predetermined time.

Each core would necessarily be provided with a gating circuit and a reset circuit such as described for cores 14 and 15 in the embodiment of the invention shown and described.

By following the teachings of the present embodiment of the invention, anyone skilled in the art may apply the present control system with its memory function to equipment and apparatus to be operated at predetermined times. One operation for which a system of this kind having a memory would be highly suitable is a bank of elevators, a group of machines in the manufacturing line, or any other mechanism requiring a number of operations in any predetermined sequence.

Since certain changes may be made in the above construction and different embodiments of the invention could be made without departing from the scope thereof, it is intended that all matter contained in the above description or shown in the accompanying drawing shall be interpreted as illustrative and not in a limiting sense.

We claim as our invention:

1. In a flip-flop circuit element of a control system, in combination, a gating circuit provided with a core and a source of electrical energy for driving the core to positive saturation during one half cycle, a reset circuit coupled with the core of the gating circuit and having a source of energy cooperative to drive the core to negative saturation during the next half cycle, means for delivering a signal to the reset circuit to block the driving of the core to negative saturation, whereby on the following gating half cycle the gating circuit is maintained energized to deliver an output and a circuit having a resistor of a predetermined ohmic value for maintaining the core saturated whereby a received signal may be stored to be delivered at a later time.

2. In a flip-flop circuit element of a control system in combination, a source of alternating current, a plurality of cores, a gating circuit and a reset circuit electrically connected to each of the cores and the source of alternating current, the circuits being so connected that one core is driven to positive saturation and the other negative saturation during one half cycle and reversed during the next half cycle, a circuit for receiving a signal, the signal serving to block the driving of one core to negative saturation, the gating circuit of said core is thereby so energized that it can deliver an output, means for delivering another signal to clear the circuits whereby the core may be driven to positive and negative saturation alternately, means associated with each core for maintaining a predetermined saturation of the core after it has been driven to positive saturation and its corresponding gating circuit energized to deliver an output.

3. In a flip-flop circuit element of a control system in combination, a source of alternating current, a plurality of cores, a gating circuit and a reset circuit electrically connected to each core and the source of alternating current, the circuits being so connected that one core is driven to positive saturation and the other to negative saturation during one half cycle, and reversed during the next half cycle, a circuit for receiving a signal, the signal serving to block the driving of the core to negative saturation during the following half cycle, the gating circuit being so energized that it can deliver an output, means for delivering another signal to a reset circuit to clear the circuits whereby the cores may be driven to positive and negative saturation alternately and means associated with each core for maintaining a predetermined saturation of the core after it has been driven to positive saturation and its corresponding gating circuit energized to deliver an output, the means for maintaining the positive saturation of a core functioning to maintain the saturation of the core irrespective of whether or not the signal is continued.

4. In a flip-flop circuit element of a control system in combination, a source of alternating current, a plurality of cores, a gating circuit and reset circuit electrically connected to each core and the source of alternating current, the circuits being so connected that one core is driven to positive saturation while another is driven to negative saturation during one half cycle, the saturation of the cores being reversed during the next half-cycle, means for delivering a signal to a core driven to positive saturation, the signal serving to block the driving of the core to negative saturation during the following half cycle, the gating circuit being thereby so energized that it can deliver an output, and means associated with each core for maintaining a predetermined saturation of the core after it has been driven to positive saturation and its corresponding gating circuit energized to deliver an output, the means for maintaining the positive saturation of the core being energized from the gating circuit of the core functioning only as long as the gating circuit is energized and ready to deliver an output.

5. In a flip-flop circuit element of a control system in combination, a source of alternating current, a plurality of cores, a gating circuit and a reset circuit electrically connected to each core and a source of alternating current, the circuits being so connected that one core is driven to positive saturation and the other to negative saturation during one half cycle, the saturation of the cores being reversed during the next half cycle, means for delivering a signal to the core driven to positive saturation, the signal serving to block the driving of the core to negative saturation during the following half cycle, the gating circuit being thereby so energized that it can deliver an output, means associated with each core for maintaining a predetermined saturation of the core after it has been driven to positive saturation and its corresponding gating circuit energized to deliver an output, the means for maintaining the positive saturation of the core functioning irrespective of whether or not the signal is continued, said means being energized from the gating circuit of the core thereby functioning only as long as the gating circuit is energized and ready to deliver an output, and means for delivering another signal to clear the circuits whereby the cores may be again driven to positive and negative saturation alternately.

References Cited in the file of this patent
UNITED STATES PATENTS

| | | |
|---|---|---|
| 2,713,674 | Schmitt | July 19, 1955 |
| 2,717,965 | Ramey | Sept. 13, 1955 |